(12) United States Patent
Crosbie (10) Patent No.: US 6,294,128 B1
(45) Date of Patent: Sep. 25, 2001

(54) METHOD OF MAKING A SUPPORTED PLURALITY OF ELECTROCHEMICAL EXTRUDED MEMBRANES

(75) Inventor: Gary Mark Crosbie, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/687,750

(22) Filed: Oct. 13, 2000

(51) Int. Cl.$^7$ .................................................. B28B 3/20
(52) U.S. Cl. ........................ 264/618; 264/634; 264/638
(58) Field of Search .................................. 264/614, 618, 264/634, 638

(56) References Cited

U.S. PATENT DOCUMENTS

| 4,158,688 | 6/1979 | Pett et al. . |
| 4,158,689 | 6/1979 | Pett et al. . |
| 4,615,851 | 10/1986 | Theodore et al. . |
| 5,961,917 | * 10/1999 | Hattori ................................. 264/672 |
| 5,993,985 | * 11/1999 | Borgium ................................ 429/31 |
| 6,025,084 | 2/2000 | Kawasaki et al. . |

OTHER PUBLICATIONS

"A 1000–cell SOFC Reactor For Domestic Cogeneration", by T. Alston et al, Journal of Power Sources 71 (1998), pp. 271–274.

"Co–Extrusion of Solid Oxide Fuel Cell Functional Elements", by Z. Liang et al, Ceramic Engineering & Science Proceedings, vol. 20, Issue 4, Jan. 1999, pp. 587–594.

* cited by examiner

Primary Examiner—Christopher A. Fiorilla
(74) Attorney, Agent, or Firm—Jennifer M. Stec (57) ABSTRACT

The present invention is a method for the manufature of a membrane structure for use in electrochemical conversions. The method includes providing a first mixture at a first temperature and a second mixture at a second temperature, extruding the first mixture to form a plurality of spaced-apart supportable membranes, cooling the extruded membrane from the first temperature to a third temperature, forming sufficient bubble surfaces of the second mixture between the membranes to facilitate the support of the membranes, cooling the extruded membranes and the formed bubble surfaces to a semi-solid from the second temperature to the third temperature less than the first and second temperatures, heating the cooled extruded membranes and the cooled formed bubble surfaces from the semi-solid at the third temperature to a predetermined elevated temperature sufficient to make the extruded membranes and the formed bubble surfaces into a sintered ceramic, and sufficiently cooling the extruded membranes and the formed bubble surfaces in the sintered ceramic to cause the bubbles to support the membranes.

15 Claims, 5 Drawing Sheets

METHOD OF MAKING A SUPPORTED PLURALITY OF ELECTROCHEMICAL EXTRUDED MEMBRANES

TECHNICAL FIELD

The present invention relates to a supported plurality of electrochemical extruded membranes and a method of manufacturing the supported membranes.

BACKGROUND ART

Chemical-to-electrical conversion technology continues to be researched, as the demand increases for higher fuel efficiency. The technical approaches regarding electrochemical conversions are numerous. Moreover, the device applications are also many. For example, electrochemical cells may be used as a NOx decomposing means, wherein the cell is used as a purifier for exhaust gases from an automobile or an electric power-generating apparatus. Moreover, the electrochemical cells may be used for cogeneration for heating domestic hot water together with electrical power.

In particular, solid oxide fuel cells (SOFC) and the derivative technologies are efficient electrochemical cells which can be used for such purposes. Solid oxide fuel cells with membranes formed by extrusion have been used in stationary but not mobile chemical-to-electrical conversions. In one approach, solid oxide fuel cells are comprised in a stationary cogenerator system, wherein a plurality of elongated tubular SOFCs are used to supply electrical power and domestic heating, as described in the referenced publication by T. Alston, K. Kendall, M. Palin, M. Prica, and P. Windibank, entitled "A 1000-cell SOFC Reactor for Domestic Cogeneration," published in the Journal of Power Sources, volume 71, pp. 271 through 278, 1998. In this stationary use, the long cantilevered tubes are not subjected to vibration. In another approach, a solid oxide fuel cell derivative NOx decomposing cell with a honeycomb structural body is formed by integrating at least one dense solid electrolyte body and at least two dense interconnects, as described in referenced patent document, U.S. Pat. No. 6,025,084. In this approach, electrodes are formed on walls of channels extending through the honeycomb structural body. Such a honeycomb structural body may be used as a NOx decomposing cell disposed in the exhaust system of a vehicle. Related honeycomb structures have been used as supports for catalytic exhaust gas treatment and can tolerate the automotive vibration environment. However, the honeycomb structure wastes material and the accompanying mass that are not actively employed in the electrochemical conversion. High power density per unit of conversion system mass is important to designers in the automotive industry, who seek ways to reducing weight while maintaining and increasing overall chemical-to-electrical efficiency.

Although elongated tubular solid oxide fuel cells have been effectively used in stationary systems, the geometrical structure of such SOFC cannot be effectively used in a variable vibration environment such as a vehicle in which vibration across a wide range of frequencies is anticipated to be present during routine operation. In such an environment, the cells will at some point begin to vibrate in resonance at which time the amplitude of the vibration will increase greatly with adverse consequences, such as breaking at a point of connection or at impact with other tubes. For example, when encountering a number of bumps or other irregularities of pavement on which it travels, a vehicle may experience large amplitude vibrations within the range of about 20 to 600 Hertz which represents a range which likely includes the tubular design resonance frequencies.

Although honeycomb structural bodies have been used to withstand the vibration in the exhaust systems of vehicles, the power density of the solid oxide fuel cells based on honeycombs is decreased, increasing the total weight and cost of the material in the chemical-to-electrical conversion system. Many honeycomb structures have geometric structures resulting in much unused material and thus less power density. For example, a honeycomb structure may include a matrix of solid electrolyte sub-bodies, each of which is separated from one another by dense interconnects. The interconnects disposed within serve only to connect bodies for aggregate voltage and do not contribute to the electrochemical conversion, resulting in added weight and less power density of the honeycomb as a whole.

DISCLOSURE OF INVENTION

It is an object of the present invention to provide an improved method of manufacturing a supported plurality of electrochemical extruded membranes. The method includes providing a first mixture at a first temperature and a second mixture at a second temperature, extruding the first mixture to form a plurality of spaced-apart supportable membranes, and cooling the extruded membrane from the first temperature to a third temperature. The method further includes forming sufficient bubble surfaces of the second mixture between the membranes to facilitate the support of the membranes, cooling the extruded membranes and the formed bubble surfaces to a semi-solid from the second temperature to the third temperature less than the first and second temperatures, and heating the cooled extruded membranes and the cooled formed bubble surfaces from the semi-solid at the third temperature to a predetermined elevated temperature sufficient to make the extruded membranes and the formed bubble surfaces into a sintered ceramic. The method further comprises sufficiently cooling the extruded membranes and the formed bubble surfaces in the sintered ceramic to cause the bubble surfaces to support the membranes.

It is another object of the present invention to provide a supported plurality of electrochemical extruded membranes. The supported membranes include a plurality of spaced-apart extruded membranes of a mixture and a supporting material of the mixture disposed between the membranes, thereby bridging the membranes together to absorb natural vibration frequencies. The membranes have holes formed therethrough and have a length of between about 1 and 40 cm. The mixture comprises a mixture of about 40–60 volume percent of sinterable particulate solids consisting essentially of a particle sized distribution of yttria-stabilized zirconia (YSZ) and about 60–40 volume percent of organic sacrificial binder.

BRIEF DESCRIPTION OF DRAWINGS

FIG. 2b is a side view, partially broken away, of the extrusion apparatus of FIG. 2a;

FIG. 2c is another side view, partially broken away, of the extrusion apparatus of FIG. 2a;

BEST MODE FOR CARRYING OUT THE INVENTION

Figure 1:
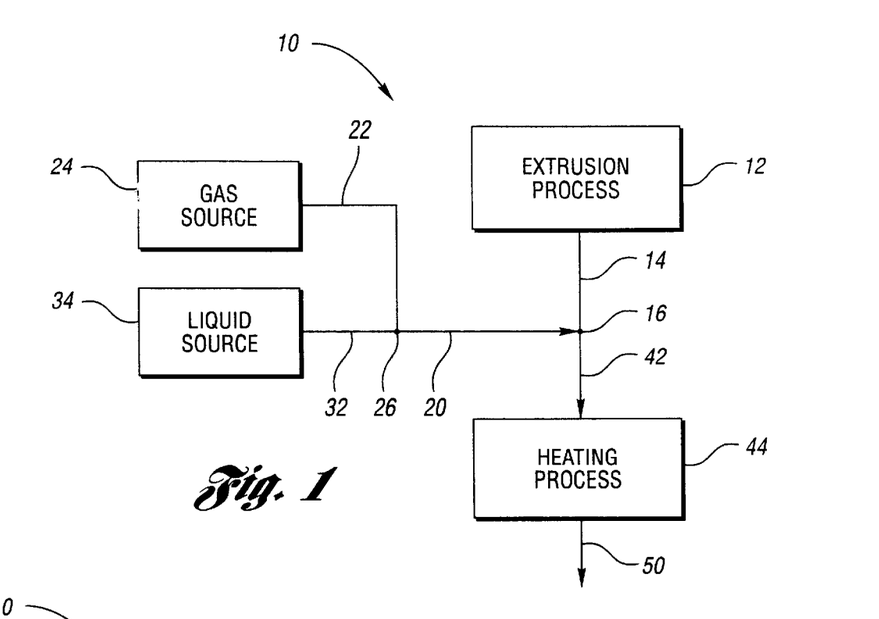
FIG. 1 is a schematic diagram illustrating the overall system which manufactures a supported plurality of electrochemical extruded membranes.

FIG. 1 is a schematic diagram depicting a system 10 for manufacturing a supported plurality of extruded electrochemical membranes. As shown, system 10 includes extrusion process 12 which extrudes a plurality of extrudates depicted by reference numeral 14. After the extrudates 14 exit extrusion process 12, bubble surfaces of a powder-liquid slurry from gas-liquid passage 20 contact and form on extrudates 14 as bubble surfaces in bubble forming area 16. Area 16 is a physical area represented as a point in FIG. 1. The powder-liquid slurry may be formed by combining a gas flow 22 with a bubble forming liquid slurry flow 32. As shown in FIG. 1, gas flow contacts liquid slurry flow at gas-liquid contact area 26. Depicted in reference numeral 42, extruded membranes with bubble surfaces are cooled and then heated in heating process 44. Depicted in reference numeral 50, the extruded membranes are then cooled to form supported plurality of membranes.

Figure 2A:
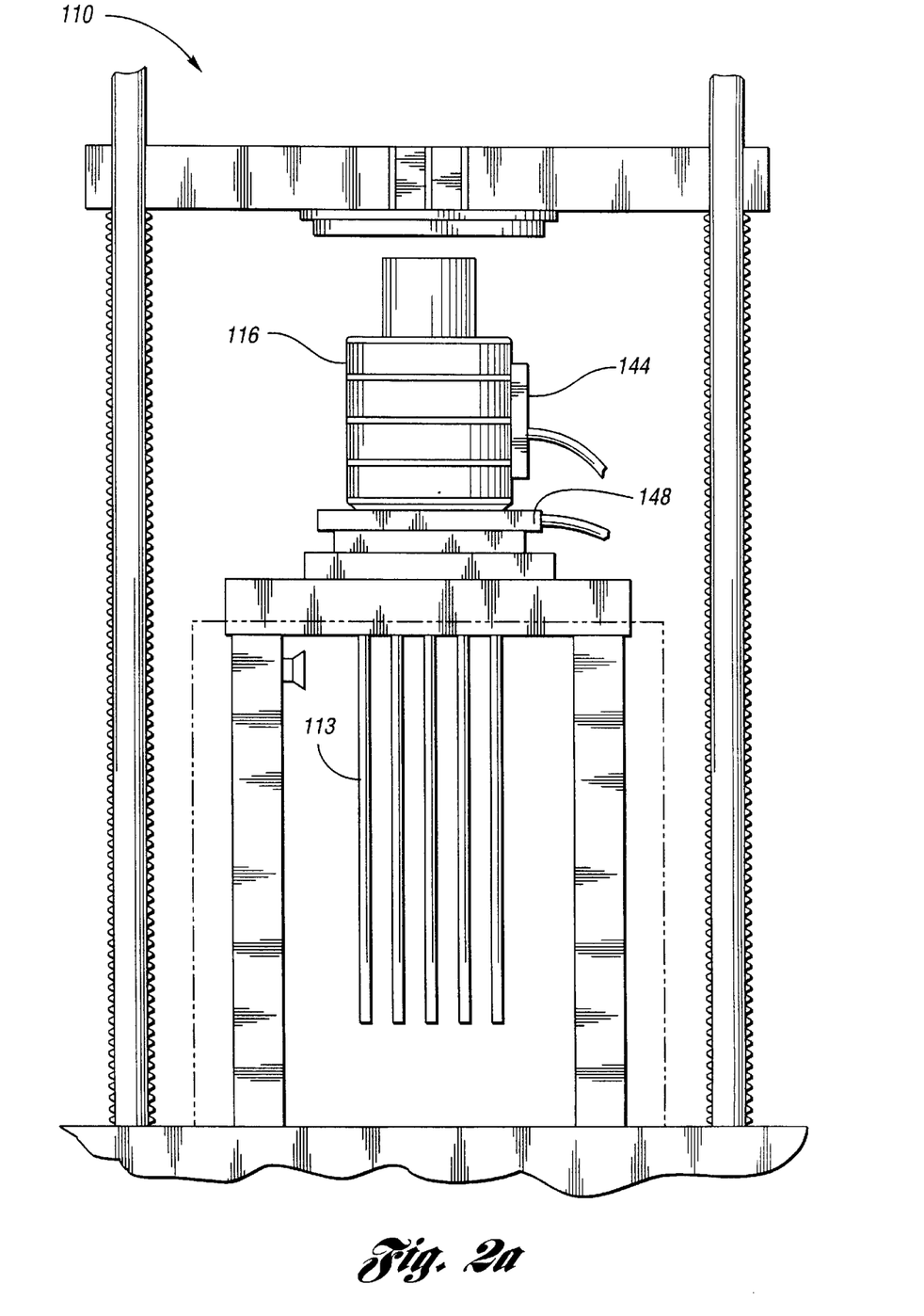
FIG. 2a illustrates an extrusion apparatus suitable for extruding the membranes of the subject invention.
Figure 2B:
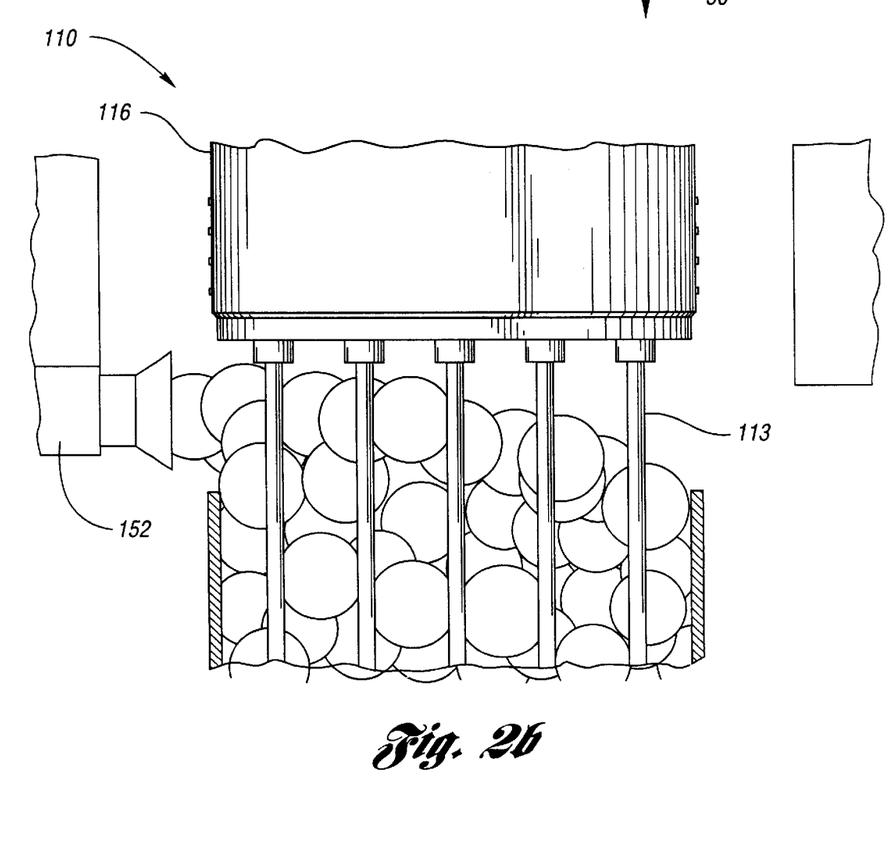
Figure 2C:
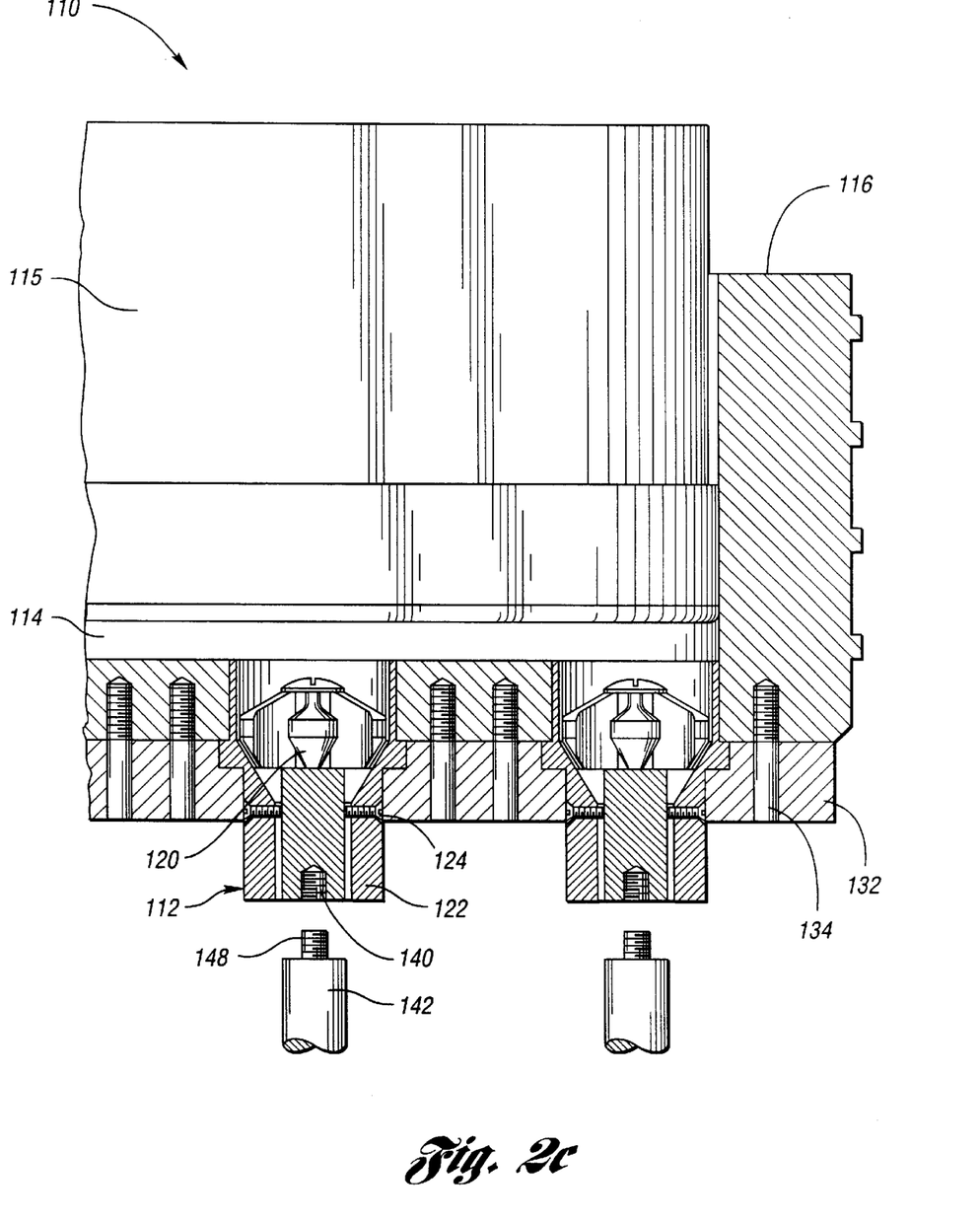

Extrusion process 12 of FIG. 1 is exemplified in FIGS. 2a–2c. As shown, extrusion process 12 includes a single-ram extrusion apparatus 110 with an extruder 116 having a plurality of dies 112 wherein each die 112 is in communication with barrel 114 of extruder 116. Barrel 114 receives ram 115 which pushes or extrudes extrudate 113 through each die 112. Each die 112 includes two parts, an inner die part 120 and an outer die part 122, wherein inner die part 120 is securely centrally positioned within outer die part 122 by positioning screws 124. As the mixture passes the positioning screws, it will separate into strips. Therefore, each die has sufficient length after the positioning screws, in order that the strips of material "knit" into a smooth, sound tube. Too short a die, after the positioning screws, will result in extrusion of strips of material, while too long a die will require excessive pressure to perform the extrusion. A ratio of die length, after the screws, to the wall thickness of the tubes extruded should be greater than 5. A ratio of 6:1 is suitable for the 7 mm O.D., 400 micrometer wall thickness, and a ratio of 12 is suitable for use with tubes whose diameter is 12 millimeters O.D. 1000 micrometers wall thickness, or larger.

Each die is mounted a short distance up into the barrel 114 of the extruder by means of ring 132, which is affixed to extruder 116 with ring screws 134. The bottom of the inner die part has a threaded opening 140 used to affix the mandrel 142, which has a set screw 143 affixed at each end. Extruder 116 and dies 112 are heated by means of the extruder heater 144 and the block heater 148 surrounding the lower portion of the die. As shown, apparatus 110 further includes nozzle 152 through which the gas-liquid slurry of FIG. 1 flows in order to form bubble surfaces on the extrudates 113.

As shown, the bubble surfaces are illustrated as spheres. Due to contact with the surfaces of the extruded membranes and other bubbles, the spheres are actually distorted from sphericity to provide a minimum of surface area. As shown, the bubble injector head is illustrated as being off to the side. If the bubble surfaces are formed from multiple heads in between the extruded membranes, it becomes possible to vary the axial spacing of the bridging bubble surfaces. In these cases the departure from sphericity can be extreme elongation.

Figure 3:
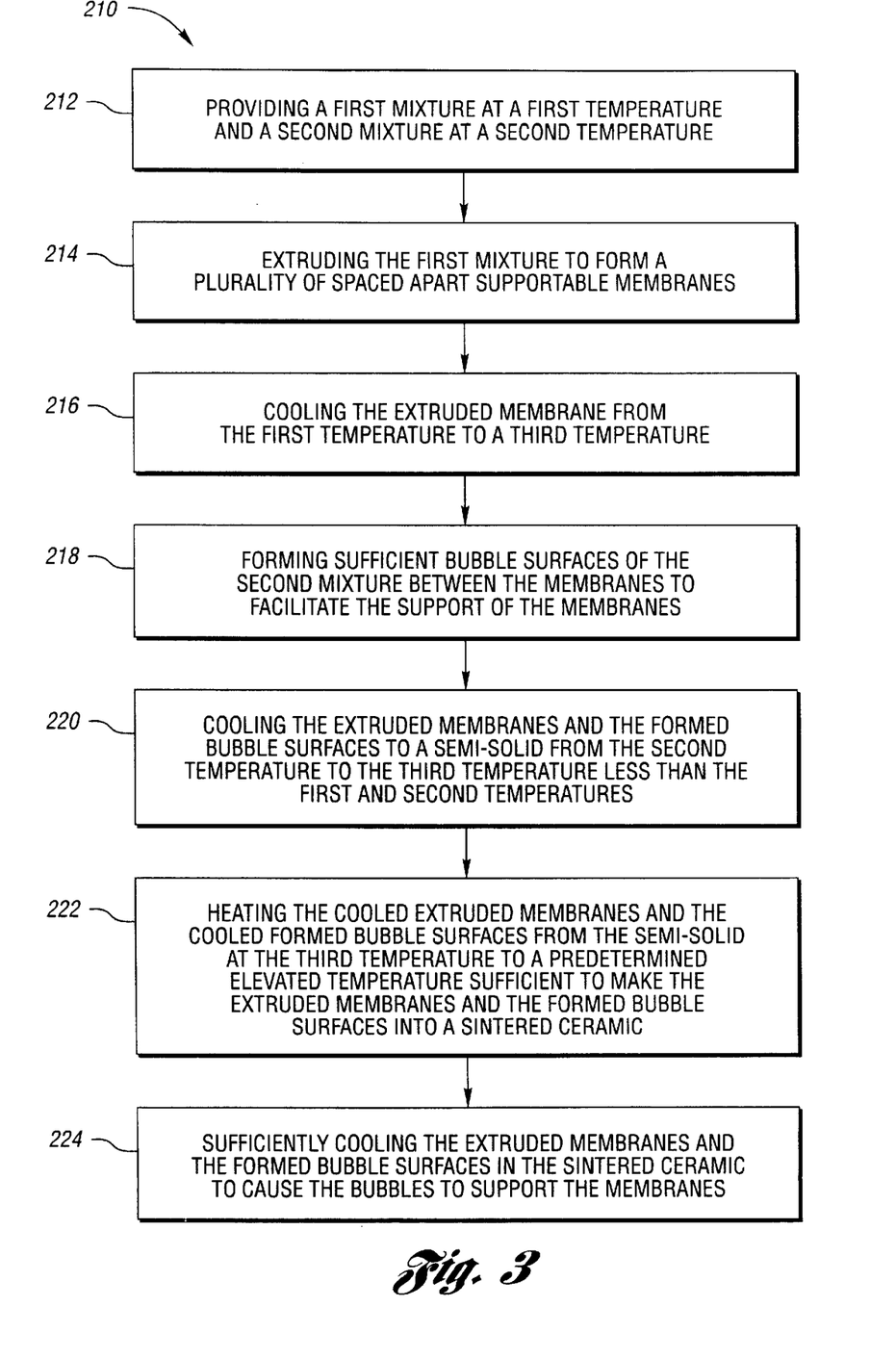
FIG. 3 is a flowchart depicting one method of manufacturing a supported plurality of electrochemical extruded membranes.

FIG. 3 illustrates one method 210 of manufacturing a supported plurality of electrochemical extruded membranes with system 10 of FIG. 1. As shown in box 212, a first mixture at a first temperature and a second mixture at a second temperature are provided. The first mixture is a sinterable particulate. Preferably, the first mixture is a mixture of about 40–60 volume percent of sinterable particulate solids consisting essentially of a particle size distribution of yttria-stabilized zirconia (YSZ) and about 60–40 volume percent organic sacrificial binder discussed in detail below.

The yttria-stabilized zirconia precursor particulate is mixed with the binder on a roll mill, after which the milled sheet is cut or broken into pieces whose size allow convenient insertion into the extruder barrel. This material is then pressed into the extruder barrel, which has been preheated. The material is then heated to the desired temperature, which is found most suitable for producing tubing of good quality from the particular composition and material being extruded. In one preferred embodiment of this invention, the yttria-stabilized zirconia precursor particulate is of 10–15 weight percent of $Y_2O_3$ in $ZrO_2$. Preferably, 13.1 weight percent of $Y_2O_3$ in $ZrO_2$ is used. The preferred temperature of the mixture during extrusion is between about 110°–150° C., and most preferably between about 137°–145° C. The temperature at various places on the surface of the extruder housing and block heater as well as the low portion of the die set is monitored by means of a digital thermometer.

Next, the method includes extruding the first mixture to form a plurality of spaced-apart supportable membranes in box 214. Ram 115 is forced against the composition in the barrel to extrude tubing from the die orifice. The rate at which the tube is extruded and the temperature of the barrel and die are adjusted until a smooth tube is obtained. The tube is extruded over mandrel 8 which has been affixed to the bottom of the inner die part by means of a screw 13, generally after the material has come to processing temperature. The mandrel is used to maintain straight tubing while the extrudate is still hot enough to deform easily. The diameter of the mandrel is slightly smaller than the diameter of the bottom portion of the inner die part.

As shown in box 216, the method further includes cooling the extruded membrane from the first temperature to a third temperature. The third temperature is preferably ambient temperature. To assist in cooling each die may be insulated in any conventional manner.

In box 218, the method includes forming sufficient bubble surfaces of the second mixture between the membranes to facilitate the support of the membranes. After a sufficient length of the membranes has been extruded and bubbles formed thereon, the membranes are cut from the die. In box 220, the method includes cooling the extruded membranes in the formed bubble surfaces to a semi-solid from the second temperature to the third temperature. After reaching ambient temperature, the tubing can be easily handled and stored without the use of a mandrel.

In box 222, the method includes heating the cooled extruded membranes and the cooled formed bubble surfaces from the semi-solid at the third temperature to a predetermined elevated temperature sufficient to make the extruded membranes and the formed bubble surfaces into a sintered ceramic. The heating process is preferably a two-stage process, a binder burn-out step and a sintering step. In the binder burn-out step, heating is performed on the bubble-formed membranes in order to evaporate the binder including any residual toluene from the structure. The binder burn-out step includes raising the temperature to about 250° C. at a rate of up to 10 degrees C. per minute, raising the temperature to about 500° C. at a rate of up to 20 degrees C. per minute, and raising the temperature to about 650° C. at a rate of up to 10 degrees C. per minute. Heating may be performed in a conventional furnace capable of constant ramp-up heating. In the sintering step, further heating is performed on the structure to solidify or densify the structure having ceramic powder to a solid (or intentionally porous) mass. The sintering step includes raising the temperature to a range between 1350 and 1550° C. for between 15 and 600 minutes. During binder burn-out, it is advantageous to support the tubes in a substantially vertical position by slipping them against a vee-shaped setter block or over a plurality of mandrels, each of which has an individual diameter small enough to allow shrinkage of the tube during binder removal. The tubes may be held in a desiccator until ready for sintering.

In box 224, the method further includes sufficiently cooling the extruded membranes and the formed bubble surfaces in the sintered ceramic to cause the bubble surfaces to support the membranes.

After cooling, the supported membrane structure having a plurality of tubular membranes formed therein are provided an anode composition. The anode composition preferably, but not necessarily, is nickel cermet. Each of the plurality of tubular membranes includes an inside diameter defined by inner cylindrical walls therealong. The anode composition is applied onto the inner walls of the tubular membranes, such that the anode composition has a thickness of 0.2 mm on the inner walls. Then, heat is applied at about 1500 degrees Celsius. The process by which the anode composition is applied onto the inner walls of the tubular membranes may be by spraying, dipping, or any other conventional means.

After applying the anode composition, a cathode composition is applied to the outer surfaces of the membranes. Then heat is applied at 1300° Celsius. The process by which the cathode composition is applied onto the outer surfaces of the membranes may be by spraying, dipping, or any other conventional means.

Figure 4:
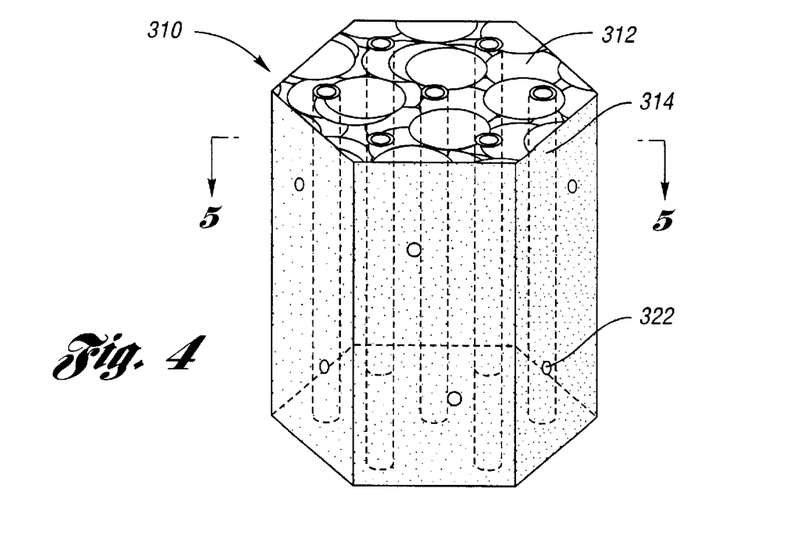
FIG. 4 is a perspective view of one embodiment of a supported plurality of electrochemical extruded membranes manufactured by the method of FIG. 3.
Figure 5:
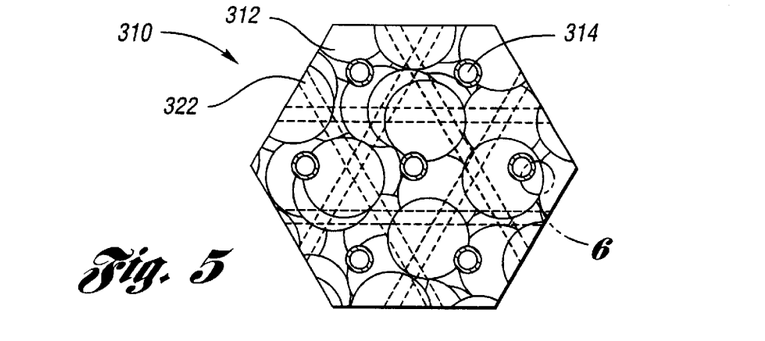
FIG. 5 is a cross-sectional view of the supported membranes of FIG. 4 taken along lines 5—5.

As shown in FIGS. 4 and 5, the resulting supported structure 310 is seen to be in this embodiment in a hexagonal shape. Solid bubble surfaces 312 formed on tubular membranes 314 are of the same composition as the membranes 314, providing the substantially fully monolithic supported fuel cell structure 310. Although it is possible to envision that the bubble surfaces break during the burnout and sintering steps, leaving supporting ligaments in the form of a skeletal foam, it has been found that the bubble surfaces do not necessarily so break. As shown, poke holes 322 have been formed substantially perpendicular to the membranes. In use, fuel flows through the membranes as air passes through the poke holes and about the membranes.

Figure 6:
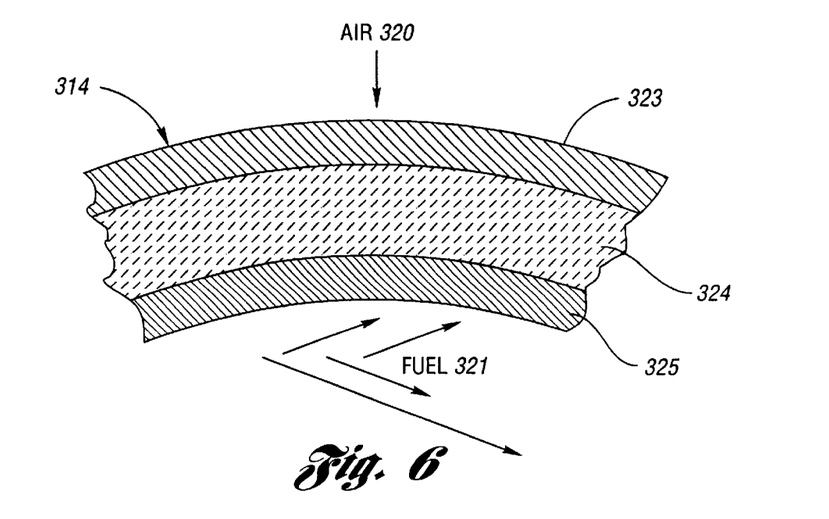
FIG. 6 is an enlarged view of circle 6 depicting a wall of a membrane of FIG. 5.

As shown in FIG. 6, in one use of the supported fuel cell structure 310, air flows through the poke holes and about the membranes. Oxygen from the air flows through the cathode 323, e.g., $La_{0.85}Sr_{0.15}MnO_3$, to the electrolyte, e.g., yttria-stabilized zirconium oxide as oxygen ions forcing the electrons through an external circuit to produce useful electrical power which may be harnessed. Fuel 321 flows axially through the length of the electrochemical extruded membranes. Hydrogen and carbon monoxide molecules derived from the fuel through the anode 325, e.g., nickel-YSZ cermet, and react with the oxygen ions exiting the electrolyte to provide the return external circuit electrons which may be harnessed to supply electrical power in a vehicle. In this case, the following reactions may occur at the electrode:

$$O_2 + 4e^- \rightarrow 2O^{2-}$$

$$2O^{2-} + 2H \rightarrow 2H_2O + 4e^-.$$

SACRIFICIAL BINDER

The sacrificial binders beneficially used in thin wall embodiments of the electrochemical extruded membranes of this invention comprise a substantial amount by weight of a block copolymer thermoplastic elastomer, plasticizer therefor, stiffening thermoplastic polymer, and processing aids. In cases such as some anode-supported solid oxide fuel cell membranes, the use of this complex sacrificial binder is less essential, as ordinary extrusion binders, such as polyvinylbutyral retain shape during burn-out of thicker wall membranes.

As described in a patent of the assignee, U.S. Pat. No. 4,615,851, the block copolymer may be a linear block copolymer such as is disclosed in U.S. Pat. No. 4,158,689, a radial block copolymer such as is disclosed in U.S. Pat. No. 4,158,688, or a combination of these block copolymers. The disclosures of U.S. Pat. Nos. 4,158,688 and 4,158,689 are hereby incorporated by reference.

Suitable radial block polymers for use in this invention are those having the structural formula $$X \text{---} [B \text{---} (AB)_{alpha} \text{---} A]_{n'}$$

wherein "X" is a linking group, A or B, "alpha" is 0 or a positive integer, "n'" is a positive integer greater than 2, "A" is a linear or branched polymer that is glassy or crystalline at room temperature 20°–25° C. and has its softening point in the range of about 80° C. to about 250° C. "B" is a polymer different from "A" that behaves as an elastomer at processing temperatures, i.e., between about 15° C. below and about 100° C. above the softening point of "A".

Suitable linear block polymers for use in this invention are those having the structural formula $$AB \text{---} (AB)_{alpha} \text{---} A$$

wherein "alpha" is 0 or a positive integer, "A" is a linear or branched polymer that is glassy or crystalline at room temperature and has a softening point in the range of about 80° C. to about 250° C. "B" is a polymer different from "A" that behaves as an elastomer at processing temperatures.

Linear and radial block copolymers are widely known. Commercially available linear and radial block copolymers are Kratons and Solprenes, respectively. Kraton is a tradename of Shell Oil Company and Solprene is a tradename of Phillips Petroleum Company. Other examples of these polymers appear in Rubber Technology, "Thermoplastic Elastomers," Hendricks, et al., 2nd Edition, pp. 515–533, VAN NOSTRAND, N.Y. (1973) and Rubber World, "Compounding Radial Block Copolymers."

The binders of this invention preferably comprise a block copolymer consisting essentially of thermoplastic radial block copolymer. Of the radial block copolymers, those with aforedescribed "A" and "B" blocks are preferred, with aromatic "A" block and aliphatic "B" block being preferred. Other "A" and "B" blocks appear in Col. 2, line 56 through Col. 3, line 3, of U.S. Pat. No. 4,158,688. The preferred radial block copolymers, suitable for use in this invention have molecular weights (M.W.) of about 100,000–200,000, a specific gravity between 0.9–1., and an apparent viscosity of between about 40–50 thousand poise at 10 seconds at about 20°–25° C.

The molecular weights of the "A" segments and the "B" segments of the block copolymers suitable for use in the method of this invention will vary with the polymer segment involved as will be obvious to one skilled in the art in that physical characteristics must be met as hereinbefore recited. For instance, where the block copolymer has polystyrene "A" blocks and polybutadiene "B" blocks, preferably unsaturated polybutylbutadiene, the polystyrene segments advantageously have number average molecular weights $(_n)$ below about 20,000 and at least two of such segments have molecular weights $(_n)$ above about 10,000. While the polybutadiene segments advantageously have molecular weights $(_n)$ below about 80,000 and at least one such segment has a molecular weight $(_n)$ above about 15,000. The lower limit of molecular weight $(_n)$ for the two "A" blocks is governed by the minimum "A" block chain length required to insure the formation of a heterogeneous phase while the upper limit of "A" blocks is set by the viscosity of both "A" and "B" blocks when such viscosity begins to hamper domain formation or processing.

The sacrificial binder employed in the method of this invention includes a plasticizer comprising oil and a wax in combination. The oils and waxes used for this purpose are naphthenic, paraffinic or a mixture of paraffinic and naphthenic constituents. They are sufficiently volatile to be removed easily and rapidly in the burnout process but insufficiently volatile to be substantially removed during mixing and/or molding. The loss due to volatilization during mixing and/or molding is advantageously below 20 and preferably below 10 weight percent. The selection is such that their evolution during burnout takes place over a broad temperature range, thus avoiding stress points and defects in parts.

Functionally, the oils and waxes must be compatible with the rubbery phase of the principal binder resin when it becomes rubbery on plasticization at a temperature somewhat below the softening point of the "A" segments of the principal resin. This gives the binder a capability of accepting higher filler loadings while remaining strong and flexible.

At least 75% by weight of the oils used as plasticizers boil in the range of about 285° C. to about 560° C., preferably in the range of about 285° C. to about 465° C. They have viscosities at 100° C. in the range of about 30 to about 220 Saybolt Universal Seconds, hereinafter referred to as S.U.S., advantageously in the range of about 35 to about 155 S.U.S., and preferably in the range of about 35 to about 80 S.U.S. These oils have an Aniline Point in the range of about 75° C. to about 125° C. The oils may be a product of petroleum refining operations or vegetable or animal oils and they may include or be low molecular weight synthetic polymers such as polystyrene, poly(alpha-methyl styrene), or a polyolefin. Examples of suitable commercially available oils include Flexon™ 580, 680, 765 and 845 marketed by Exxon and Shellflex™ 371 and 790 marketed by Shell Chemical Co.

The waxes used have melting points in the range of about 55° C. to about 80° C. At least about 75% by weight of such wax boils at temperatures in the range of about 315° C. to about 490° C. These may be a product of petroleum refining operations, vegetable or animal oils or synthetic polymers such as low molecular weight polyolefins. Examples of suitable commercially available waxes are Sunoco Wax™ 3420, 4412 and 4418 marketed by Sun Chemical as well as paraffin wax (M.P. 54° C.) marketed by International Wax Refining.

The binder of this invention further includes a first and a second stiffening thermoplastic polymer which are glassy or crystalline at 20°–25° C., have a softening point between about 80°–250° C. and comprise aromatic monomeric units associable with the block copolymer. The stiffening polymer preferably has a molecular weight in the range between about 50,000 and 400,000, more preferably 100,000 and 300,000, wherein such molecular weight refers to a weight average molecular weight (Flory). The second stiffening polymer is different from the first stiffening polymer and also functions as a tackifying thermoplastic polymer. Preferred second stiffening polymers have a melt viscosity of about 10 poises at 157°–205° C.

For example, if the "A" block of the block copolymer is a polystyrene, then the first stiffening thermoplastic polymer preferably is a polystyrene or other thermoplastic aromatic polymer. In addition to stiffening, such a thermoplastic polymer should also aid in mixing the sacrificial binder composition ingredients. A thermoplastic polystyrene polymer such as Styron 495™, marketed by Dow Chemical Company, does this because it ha a lower viscosity than the thermoplastic block copolymer at processing conditions; on the other hand it is sufficiently crystalline at room temperature to advantageously stiffen the formed green body. Furthermore, according to this example, if the first stiffening polymer is polystyrene as mentioned, the second stiffening polymer is aromatic but has a different aromatic moiety, e.g., indene. A preferred second polymer is polyindene. Low molecular weight polyindenes have the further advantage of low viscosity at processing conditions. The low viscosity aids flow of the sacrificial binder compositions.

Using two different polymers also advantageously permits the sequential expulsion of the stiffening polymers during firing of the green bodies.

The process aid comprising esters of fatty acids are preferably selected from acetyl ricinoleate esters, which are single and double esters of ricinoleic acid. Their presence serves as an effective processing aid, acting as an anti-stick agent during calendering and extruding. The acetyl ricinoleate esters are also useful in wetting and dispersing the ceramic particulate so as to form a homogeneous mixture. The most useful type of this plasticizer processing aid for the subject invention is the Flexricin™ plasticizer, such as Flexricin™ P-4, methyl acetyl ricinoleate, and Flexricin™ P-6, butyl acetyl ricinoleate.

In this particulate binder mixture, the weight of the thermoplastic block copolymer is greater than the weight of the oil and wax combined, and greater than the weight of the stiffening polymers combined. The weight of the block copolymer is also greater than two times the weight of the oil, the wax, the first stiffening polymer, the second stiffening polymer or the processing aid alone.

Additional process aids which are conventional to molding and forming operations with polymeric materials are likewise useful in the practice of this invention to improve the flow characteristics of the binder-filler mixture to during such operations. Process aids which may be of assistance include stearic acid, polyethylene, polyethylene wax, mixtures of natural waxes and wax derivatives, vegetable fats, partially oxidized polyethylene, etc. Others will be apparent to those skilled in the art.

Other ingredients may be employed in the binders of this invention. For example, antioxidants are useful to retard oxidative degradation of the block polymer during mixing, thus minimizing loss of strength in the green body. The antioxidant also allows more rapid removal of binder during burnout by minimizing surface oxidation which may tend to seal off the surface. Suitable antioxidants include, but not by way of limitation, 2,6-ditert-butyl-phenol, a polymerized 1,2-dihydro-2,2,4-trimethyl quinoline, 2-mercaptobenzimidazole, tetra-bis-methylene-3-(3,5-ditert-butyl-4-hydroxy phenyl)propionate methane, etc.

sinterable Particulate

The powdered yttria-stabilized zirconia (YSZ) precursor particulate most useful in the practice of the method of this invention has a particle size distribution of about 0.05–80 microns, with a preferred average particle size of greater than 0.3 microns and a most preferred particle size between about 0.5 and 0.8 microns. Additionally it is most preferred that the percentage of particles with diameters over 5 microns be less than 10 percent.

The weight proportion of binder to precursor particulate solids of yttria-stabilized zirconia may vary widely but is preferably as high as possible for sintering of fully dense bodies while maintaining extrusion pressures in a workable range. Normally, the volume ratios of binder to yttria-stabilized zirconia precursor particulate will be about 70/30 to 40/60, preferably for very dense bodies between about 50/50 to 40/60.

Note that in order that the ceramic binder composition of this invention be homogeneous and extrudable into tubes suitable for use, as for example, in the solid oxide fuel cell, the components have to be combined in a particular order. The proper order of addition of components (including optional components) is: elastomer, antioxidant, yttria-stabilized zirconia precursor particulate, waxes, stiffening agents, oils and processing aids. Reversing the order of addition of the waxes and stiffening agents results in compositions that can not be extruded. Reversing the order of addition of oils and stiffening agents has the same effect. In selecting the optimum composition of the mixture to be extruded, careful tailoring of the die and the viscosity of the mixture to be extruded is required for preparation of good tubing. The apparent viscosity of the material should be high enough to develop the back pressure needed for knitting of the strips to form a tube. At too low an apparent viscosity, strips are extruded. Of course, if viscosity is too high, excessive pressure will be required to perform the extrusion.

For the preferred particulate ceramic binder composition of the invention, it is preferable to extrude the tubing within three days after mixing the binder-ceramic composition. It was found that the quality of the extrudate deteriorates as a function of time after mixing and also that more force is required to extrude the material. Additionally, although the mixture can be re-extruded, quality of the extrudate lessens with each subsequent extrusion. It is, therefore, suggested that a maximum of two extrusions be used in the preparation of the tubing.

At extrusion temperatures, the "life" of the mixture in the barrel is approximately 1 hour. This will be slightly longer or shorter depending on the time that has elapsed since the material is mixed and the quality of the tube needed.

EXAMPLES

Example 1 is of an electrolyte supported solid oxide fuel cell. In this example, Mixture 1 is a fully-stabilized micron-sized YSZ powder compounded with the special thermoplastic elastomer binder. Mixture 2 is made of the same yttria-stabilized zirconia (YSZ) powder in same binder but with sufficient toluene added to lower viscosity.

In particular Mixture 1 consists of 9.6 g Calprene™ (Dynasol Corp.), 1.4 g Styron™ 495R (Dow Plastics), 2 g paraffin wax #32721-2 (Sigma-Aldrich), 2 g paraffin wax #31765-9 (Sigma Aldrich), 1.4 g Picco™ 5140 hydrocarbon resin (Hercules), 2 g Flexon™ 845 (Exxon), 3.4 g Shellflex™ 371 (Equilon), 1 g AgeRite™ Resin D (R. T. Vanderbilt), and 44 g of yttria-stabilized zirconia (FYT 13.0-001 of Muscle Shoals).

In particular, Mixture 2 consists of all of the above constituents of Mixture 1, plus 25 g toluene, dissolved in at 50 degrees Celsius.

Mixture 1 is extruded at 130 deg C. Bubble surfaces are formed from Mixture 2 after the 19 tubes of diameter each 2 mm O.D. and 0.2 mm wall thickness are extruded in a hexagonal pattern with counts in sequential rows of 3, 4, 5, 4, and 3. Axial spacing between bubble surfaces is approximately 3 cm. Toluene evaporates leaving solid bubble surfaces. Dried, air access holes are obtained by poking holes through the bubbles. The assemblage is then burned out to remove the fugitive binder with controlled heating rates, and sintered at 1500 deg C. for 2 hours in air, producing dense electrochemical extruded tubes which are supported mechanically by the bubble surfaces. Because the spacing between the axially spaced bubble surfaces is much less than 12 cm, the resonant frequency is well above 3000 Hz. To complete the electrochemical cell manufacture, the hexagon assembly side faces are masked off and the assembly is dip coated in anode cermet precursor (YSZ powder with fine nickel oxide powder containing 5 micron starch as a pore former) which adheres to the inside diameters of the dense membranes. Then the top and bottom surfaces are masked and the unit is dip coated in strontium doped lanthanum manganite slurry (containing YSZ powder and starch). Hydrogen rich reformed fuel is provided to the assemblage bottom and air flows across through the poke holes. After reduction of the NiO to Ni on the anode by the reducing gas of the fuel, a voltage is produced between the anode and the cathode.

Example 2 is of an electrolyte supported solid oxide fuel cell with the membranes having a stellate cross-section, instead of the circular cross-section of Example 1, in order to enlarge the surface area of the electrolyte. Each of the 19 tube extrusion dies consists of matching pairs of six-pointed star shapes with rounded corners and sharpest interior angles of 30 deg angular. The extrusion of Mixture 1 thus produces tubes with stellate cross-section and wall thickness of 0.2 mm and circumscribed outside diameter of 2.4 mm. Subsequent processing steps are as given in Example 1 to produce assemblages that can produce voltages. Because of the higher surface area, the power density is expected to be 30% higher than for Example 1.

Example 3 is of an electrolyte supported fuel cell with highly active electrode layers immediately adjacent to the electrolyte. The extrusion and bubble surfaces are formed as in Example 1. However, an additional step is added at the stage of coating the anode and the cathode. In particular, after masking the sides of the hexagonal assemblage, a sol-gel precursor of gadolinia-doped ceria is applied to the inside of the 19 tubular membranes to form a 5 micron layer on the inside diameter. The remainder of the anode is formed by dip coating, as in Example 1. After firing, the highly active anode layer has a finer pore size and a higher electrochemical exchange current than is found in the bulk thickness of the dip-coated anode. To produce a similarly highly activated layer, after masking the top and bottom of the assemblage, a ceria-manganite-producing sol-gel coating is applied to the cathode side. The remainder of the cathode is formed by dip coating, as in Example 1. After firing, the highly active cathode layer has a finer pore size and a higher exchange current than is found in the bulk thickness of the dip-coated cathode. As a consequence, the overpotential voltages associated with the cathode and anode decrease, providing higher useful fuel cell power output than in the same geometry of Example 1.

Example 4 is of an anode-supported solid oxide fuel cell. This serves an example in which the useful extruded electrochemically-active membrane is porous even after particulate sintering. Although the Mixture 1 of this example is compounded of the thermoplastic elastomer as in Example 1, the particulate solids are here the ones of the anode-cermet-producing powders of NiO and YSZ together with 5 micron starch as a pore-forming agent. Likewise, here, Mixture 2 is of the same elastomer with toluene as in Mixture 2 in Example 1 to form bubble surfaces, but here with the same particulate solids and starch as in the Mixture 1 of this example, namely, the anode-cermet-producing powders of NiO and YSZ together with 5 micron starch as a pore-forming agent. Mixture 1 is extruded to form 0.2 mm wall thickness tubes with 2 mm outside diameters. The bubble surfaces are then formed from Mixture 2 with axial spacings of 1.8 cm. Although a closer axial spacing of the bridging bubble surfaces than in Example 1 requires additional poke holes to allow air access to the outside diameters, the closer spacing helps compensate for mechanical strength in view of the lower strength of the porous anode bulk from the extrusion. Once dried and burned out, the anode supported green body is fired at 1400 deg C. for 2 hours. After masking of the top and bottom ends of the hexagonal assemblage, a slurry of ultrafine YSZ particulate solids that have been agglomerated to a 0.5 micron sedimentation diameter is applied by dip coating to the outside diameters of the fired, but still porous, electrochemical membrane tubes and bridging bubble surfaces. After firing at 1300 deg C., a gas tight electrolyte membrane is formed on the outside diameter of the membrane tubes and bridging bubble surfaces. Then the cathode is applied as in Example 1.

In contrast to the electrolyte thickness of about 200 micron in Example 1, a much lower bulk electrolyte resistance is obtained in this example, by making a 10 micron thick gas-impermeable layer of the solid electrolyte on the surface of the porous anode. In this way, the anode-supported SOFC can produce greater useful power output for this cell of similar geometry of Example 1, while retaining the benefits of the inventive vibration tolerant structure.

Example 5 is of an anode-supported fuel cell like that of Example 4 but with thicker extruded walls that permit the use of a simpler binder system than in Example 1 and Example 4. In this Example, each of the 19 extrusions is of 3 mm outside diameter (not 2 mm) with a wall thickness of 0.4 mm (not 0.2 mm). Because of the greater strength of the thicker wall during burnout, here, the binder in Mixture 1 is polyvinyl butyral (Butvar 98). The other constituents completing Mixture 1 are the same as in the Example 4: NiO, YSZ, and starch. For this Example, Mixture 2 consists of NiO, YSZ, and starch. Again, different from Example 4, the other constituents are polyvinyl butyral (Butvar 98) and 2-propanol to lower the viscosity to allow bubble formation. The processing steps follow those of Example 4, through drying, burnout, sintering at 1400 deg C., and application of a thin gas-impermeable electrolyte layer and then the cathode. With the greater thickness of the extruded electrochemical membrane, distortion of the membrane due to slumping during burnout is lessened, even with the simpler binder system.

Example 6 is of a cathode-supported solid oxide fuel cell. In much the same way as Example 4 with anode-support, here, a porous cathode layer is the support. Mixture 1 and Mixture 2 here differ from those in Example 1 in that the particulate solids in both are strontium-doped lanthanum manganite, YSZ powder and starch. The dried, burned-out assemblage is fired at 1350 deg C. for 2 hours. The thin electrolyte layer is formed by electrochemical vapor deposition on the inside diameters of the extruded tubes. Then, a sol-gel anode precursor composition is applied to the inside diameter and the assemblage is fired at 1000° C.

Example 7 is an example of use of the structure with a cation-conducting solid electrolyte with liquid instead of gaseous reactants: a sodium-sulfur battery. In this case, the particulate solids in Mixture 1 and Mixture 2 are calcined precursors to 8.85 $Na_2O$–0.75 $Li_2O$ beta"-alumina. Mixture 2 has toluene added to lower the viscosity and allow bubble formation. Drying and burnout precede platinum encapsulation and sintering at 1565 deg C. for 15 minutes. Sodium metal is fed to the inside diameters of the extruded electrochemical tubes and a physical mixture of sulfur and chopped carbon felt is provided in contact with the outside diameters of the extruded tubes to produce a voltage.

Example 8 is an example of a refractory heat exchanger. Different from Example 1, here the particulate sinterable powders in Mixture 1 and Mixture 2 are 99.8% purity alpha-aluminum oxide powders. After drying, burnout, sintering is carried out at 1530° C. for two hours in air. Combustion flames in the cross-flow on the outside diameters of the extruded electrochemical tubes provide heating of the gas flowing perpendicularly in the inside of the tubes.

Example 9 is an example of steam electrolysis to produce hydrogen and oxygen. This example differs from Example 1 in that both electrodes are formed from coating with platinum paste. Steam flowing in the inside diameters is enriched with hydrogen by the electrical pumping away of oxygen as ions through the YSZ membranes.

Example 10 is an example of a light-weight NOx decomposition cell for treatment of automotive exhaust gases. Following the established chemistries for this application, Mixture 1 and Mixture 2 have particulate solids which are submicron cerium oxide powders. After drying and burnout, the body is fired at 1550° C. to produce dense membranes of cerium oxide. In this case, both anode and cathode can be formed by dip coating simultaneously, because they are of the same composite of fine cerium oxide with palladium metal.

Example 11 is an example of an electrolyte-supported solid oxide fuel cell in which the bubble surfaces are ruptured during the burnout process leaving bridging ligaments to form a skeletal foam. This open cell structure of the supporting foam allows the elimination of one of the steps of Example 1, namely, there is no need to poke holes through the assemblage to allow gas access to the outside diameters of the extruded electrochemical tubes. Although our understanding is incomplete, the formation of the skeletal foams is increased with faster heating rates.

Example 12 is an example of the use of an alternate electrolyte in an electrolyte-supported solid oxide fuel cell, namely gadolinia-doped ceria. Different from Example 1, the sinterable particulate solids in Mixture 1 and Mixture 2 are gadolinia doped ceria.

Example 13 is an example of an anode-supported solid oxide fuel cell with an alternate thin layer electrolyte, namely, yttria-stabilized zirconia with co-doping of scandia. This example is similar to that of Example 4. The difference is in that the sol-gel precursor for the thin electrolyte upon firing produces a composition of 11 mol. % scandia plus 8 mol. % yttria in a balance zirconia composition. Because of the higher bulk diffusion and exchange currents at the electrodes, the cell is able to produce higher power densities than Example 4.

Example 14 is an example of the use of a photocuring binder in the Mixture 2. It differs in from Example 1 in that the Mixture 2 composition includes a blue-light/ultraviolet sensitive constituent, which induces solidification of the bubble surfaces.

While the best mode for carrying out the invention has been described in detail, those familiar with the art to which this invention relates will recognize various alternative designs and embodiments for practicing the invention as defined by the following claims.

What is claimed is:

1. A method of manufacturing a supported plurality of electrochemical extruded membranes, the method comprising:

providing a first mixture comprising at a first temperature and a second mixture at a second temperature;

extruding the first mixture to form a plurality of spaced-apart supportable membranes;

cooling the extruded membrane from the first temperature to a third temperature;

forming sufficient bubble surfaces of the second mixture between the membranes to facilitate the support of the membranes;

cooling the extruded membranes and the formed bubble surfaces to a semi-solid from the second temperature to the third temperature less than the first and second temperatures;

heating the cooled extruded membranes and the cooled formed bubble surfaces from the semi-solid at the third temperature to an elevated temperature sufficient to make the extruded membranes and the formed bubble surfaces into a sintered ceramic; and sufficiently cooling the extruded membranes and the formed bubble surfaces in the sintered ceramic to cause the bubbles to support the membranes.

2. The method of claim 1 wherein the first temperature is between a range of 110 and 150 degrees Celsius.

3. The method of claim 1 wherein the second temperature is less than 80 degrees Celsius.

4. The method of claim 1 wherein the first mixture is a mixture of about 40–60 volume percent of sinterable particulate solids consisting essentially of a particle size distribution of yttria-stabilized zirconia and about 60–40 volume percent organic sacrificial binder in an extruder for extruding the first mixture, wherein the sacrificial binder consists essentially of:

(a) a thermoplastic block copolymer component selected from the group consisting of linear, radial and linear and radial block copolymers, the block copolymers having a first aromatic block which is glassy or crystalline at 20–25 degrees Celsius (C.), and which has a softening point between about 80–250 degrees C. and a second aliphatic block which is different from the first block and behaves as an elastomer at temperatures between about 15 degrees C. below and about 100 degrees C. above the softening point of the first block;

(b) two oils having different initial boiling points and being selected from the group consisting of oil at least about 75 percent by weight of which boils in a range of between about 285–560 degrees C., and which has a viscosity of between about 30–220 Saybolt Universal Seconds (SUS) at 100 degrees C. and an Aniline Point in a range between about 75–125 degrees C.;

(c) two waxes having different initial boiling points and being selected from the group consisting of wax melting at a temperature in a range of between about 55–80 degrees C., and at least 75 percent by weight of which boils at temperatures in a range between about 315–490 degrees C.;

(d) a first stiffening thermoplastic polymer which is glassy or crystalline at 20–25 degrees C. and which has a softening point between about 80–250 degrees C. and comprises aromatic monomeric units associable with block copolymer (a);

(e) a second stiffening thermoplastic polymer, different from the first polymer and which is glassy or crystalline at 20–25 degrees C., and which has a softening point between about 80–250 degrees C. and comprises aromatic monomeric units associable with block copolymer (a); and (f) processing aid comprising an ester of fatty acids, the weight of (a) being greater than (b) and (c) combined, greater than (d) and (e) combined and greater than about two times (b), (c), (d), (e), or (f) alone, and the order of mixing being the thermoplastic block copolymer (a), the sinterable particulate, the waxes (c), the stiffening agent (d) and (e), the oils (b), and the processing aids (f).

5. The method of claim 4 wherein the second mixture is the first mixture and the sacrificial binder diluted in a volume percent of toluene.

6. The method claim of claim 5 wherein the volume weight percent of toluene is about 40 to 70 weight percent.

7. The method of claim 4 wherein the step of heating the first and second mixtures includes:

raising the temperature to about 250 degrees Celsius at a rate of up to 10 degrees per minute;

raising the temperature to about 500 degrees Celsius at a rate of up to 20 degrees Celsius per minute;

raising the temperature to about 650 degrees Celsius at a rate of up to 10 degrees C. per minute; and raising the temperature to a range between 1350 and 1550 degrees Celsius for between 15 and 600 minutes.

8. The method of claim 1 wherein the bubbles of the second mixture have a viscosity of 50–1000 mPa-sec when forming bubble surfaces.

9. The method of claim 8 wherein space between faces of the bubbles is determined by the average diameter of the tubes multiplied by about 1 to 30.

10. The method of claim 1 wherein the step of extruding includes an extruder having a plurality of tubes through which the first mixture is extruded to form a plurality of spaced-apart supportable membranes, the tubes having an outside diameter of less than 1 cm.

11. The method of claim 1 wherein the third temperature is about room temperature.

12. The method of claim 1 wherein the semi-solid of the extruded membranes and formed bubbles has a viscosity of about 1000 to 100,000 mPa-sec.

13. The method of claim 1 wherein the solid of the cooled extruded membranes and the cooled formed bubbles has a viscosity of about 1,000 to 1,000,000 mPa-sec.

14. The method of claim 1 further comprising:

providing inner and outer walls of each extruded membrane;

applying an anode slurry to the inner walls of each extruded membrane;

raising the temperature to about 1,550° C. for between 15 and 600 minutes;

cooling the inner walls of each membrane;

applying a cathode slurry to the outer walls of each extruded membrane;

raising the temperature to about 1,350° C. for between 15 and 600 minutes; and cooling the outer walls of each extruded membrane.

15. The method of claim 14 wherein the anode slurry includes nickel-Yttria-stabilized zirconia cermet and the cathode slurry includes $La_{0.85}Sr_{0.15}MnO_3$ and Yttria-stabilized zirconia.

* * * * *